United States Patent
Nichols

(10) Patent No.: US 10,599,716 B2
(45) Date of Patent: *Mar. 24, 2020

(54) LOADING DATA FROM A NETWORK SOURCE IN A DATABASE SYSTEM USING APPLICATION DOMAIN LOGIC CORESIDING WITH THE NETWORK INTERFACE

(71) Applicant: International Business Machines Corporation, Armonk, NY (US)

(72) Inventor: Roger W. Nichols, Sudbury, MA (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/150,872

(22) Filed: May 10, 2016

(65) Prior Publication Data

US 2017/0039284 A1 Feb. 9, 2017

Related U.S. Application Data

(63) Continuation of application No. 14/817,483, filed on Aug. 4, 2015.

(51) Int. Cl.
*G06F 16/78* (2019.01)
*H04L 29/06* (2006.01)
(Continued)

(52) U.S. Cl.
CPC .... *G06F 16/7867* (2019.01); *G06F 16/24569* (2019.01); *G06F 16/903* (2019.01);
(Continued)

(58) Field of Classification Search
None
See application file for complete search history.

(56) References Cited

U.S. PATENT DOCUMENTS 7,676,554 B1 3/2010 Malmskog et al.
8,542,695 B1 * 9/2013 Melick ............... H04B 1/7163
370/390

(Continued)

FOREIGN PATENT DOCUMENTS

JP 11045259 A 2/1999

OTHER PUBLICATIONS

Henrique Andrade; Optimizing the Execution of Multiple Data Analysis Queries on Parallel and Distributed Environments; 2004; IEEE; pp. 520-532.*

(Continued)

*Primary Examiner* — Mariela Reyes
*Assistant Examiner* — Jermaine A Mincey
(74) *Attorney, Agent, or Firm* — Robert Bunker; SVL IP Law Edell, Shapiro & Finnan, LLC

(57) ABSTRACT

A system for executing database queries comprises a computer system including at least one computer processor and one network interface component. The computer processor is configured to determine that at least a portion of data requested by a query is remote data stored at a remote network source. The network interface component of the computing system retrieves the remote data from the remote network source. The retrieved remote data is pre-processed using application domain logic coresiding with the network interface component to generate a result set based on one or more parameters of the query and the query result is returned to the computer processor. The application domain logic may be implemented in a graphics processor unit (GPU), a field-programmable gate array (FPGA), or an application specific integrated circuit (ASIC).

6 Claims, 4 Drawing Sheets

(51) Int. Cl.
*G06F 16/245* (2019.01)
*G06F 16/903* (2019.01)
*G06F 16/9535* (2019.01)
*H04L 29/08* (2006.01)

(52) U.S. Cl.
CPC ...... *G06F 16/9535* (2019.01); *H04L 67/1097* (2013.01); *H04L 67/42* (2013.01)

(56) References Cited

U.S. PATENT DOCUMENTS

| | | |
|---|---|---|
| 8,924,470 B2 | 12/2014 | Krahulec et al. |
| 2002/0108059 A1 | 8/2002 | Canion et al. |
| 2006/0089945 A1* | 4/2006 | Paval ................ G06F 17/30607 |
| 2009/0055354 A1* | 2/2009 | Arad ................. G06F 17/30864 |
| 2010/0023502 A1* | 1/2010 | Marlow ............ G06F 17/30864 |
| | | 707/E17.017 |
| 2011/0040771 A1* | 2/2011 | Gilyadov .............. G06F 13/385 |
| | | 707/754 |
| 2011/0313995 A1* | 12/2011 | Lederman ........... G06F 17/2809 |
| | | 707/707 |
| 2012/0179810 A1* | 7/2012 | Contreras Delpiano .................... |
| | | H04W 48/18 |
| | | 709/224 |
| 2014/0050091 A1 | 2/2014 | Biswas et al. |
| 2016/0234290 A1* | 8/2016 | Sharma .................. H04W 4/02 |

OTHER PUBLICATIONS

Yatin Hoskote; A 5-Ghz Mesh Interconnect for a Teraflops Processor;IEEE;2007;pp. 51-61; (Year: 2007).*

List of IBM Patents or Patent Applications Treated As Related, May 10, 2016, 1 page.

* cited by examiner

LOADING DATA FROM A NETWORK SOURCE IN A DATABASE SYSTEM USING APPLICATION DOMAIN LOGIC CORESIDING WITH THE NETWORK INTERFACE

CROSS-REFERENCE TO RELATED APPLICATIONS

This application is a continuation of U.S. patent application Ser. No. 14/817,483, entitled "Loading Data From A Network Source In A Database System Using Application Domain Logic Coresiding With The Network Interface" and filed Aug. 4, 2015, the disclosure of which is incorporated herein by reference in its entirety.

BACKGROUND

Present invention embodiments relate to query processing in data processing systems, and more specifically, to execution of queries using application domain logic coresiding with the network interface on data retrieved from a network source.

Modern databases have data distributed among multiple computer machines. For example, one database engine of an on-line data store may be running on a database server machine but the on-line data store may have data or need access to data stored in multiple locations, some of which may be remote and/or even offline. As databases grow larger, loading necessary data from the remote and offline locations is an increasingly important part of instantiating a data set. Relatedly, data sets are growing larger, and thus making near line and/or offline data stores necessary in large databases. In current technology, metadata about this remote data is used to determine whether the remote data is relevant before loading data into an on-line data store. This metadata analysis and loading is done by the database engine.

Culling and loading data from remote locations, however, carries a significant overhead for the database engine. Conventional database systems typically retrieve data from the remote locations, store the retrieved data into local storage (such as local hard drives) and then query the data in the local memory to generate the result set. Multiple acceleration techniques have been used by modern database systems to accelerate the process. One technique uses a specialized network interface device to move the received remote data to the local storage (e.g., hard drives and/or flash PCI device) and another technique uses a co-processor to pre-process results to reduce data passed back to the computer processor. In those techniques, the computer processor (e.g., the CPU) plays the central role in setting up and monitoring the data retrieval process, acknowledging data receipt, setting up the co-processor, passing data to the co-processor and using the result data from the co-processor to generate a result set to return to database applications. The whole process is inefficient and consumes a lot of computing resources, especially when the remote data has to be ingested into the local database engine (e.g., loading into the local database for the first time).

SUMMARY

According to one embodiment of the present invention, a system executes database queries and comprises a computer system including at least one computer processor and one network interface component. The computer processor is configured to determine that at least a portion of data requested by a query is remote data stored at a remote network source. The network interface component of the computing system retrieves the remote data from the remote network source. The retrieved remote data is pre-processed using application domain logic coresiding with the network interface component to generate a result set based on one or more parameters of the query and the query result is returned to the computer processor.

BRIEF DESCRIPTION OF THE DRAWINGS

Generally, like reference numerals in the various figures are utilized to designate like components.

DETAILED DESCRIPTION

Embodiments according to the present invention may load data from a remote source using application domain logic coresiding with a network interface component. The remote source may be a storage device on a local area network (LAN), a wide area network (WAN), or the Internet, for example, a storage device on a storage area network (SAN) based on Internet Small Computer System Interface (iSCSI). In one embodiment, in a computer system running a database application, the location of the data needed may be computed from data itself, e.g., via metadata, parameters of the query, or other information. A network interface component may include specially programmed application domain logic. The application domain logic may be implemented as, for example, a graphics processor unit (GPU), a field-programmable gate array (FPGA), an application-specific integrated circuit (ASIC) or a microprocessor with software code (e.g., a software module). The central processing unit (CPU) of the computer system may receive a query from an application. The CPU may determine at least some of data for the query may be stored remotely, prepare query parameters for the remote data and send the query parameters to the network interface component. The network interface component may retrieve the remote data and use the application domain logic to pre-process the retrieved data with the query parameters to generate a result set, which may be returned to the CPU. In one embodiment, the remote data may be video. In this embodiment, the data may be pre-processed using the application domain logic and transferred directly to a graphics processing card (GPU) or display card. Moreover, in one embodiment, if database data is stored locally in a sorted manner, the application domain logic may insert/shuffle locally stored data to maintain the stored sorted order. In another embodiment, a dataset may be loaded from a remote location, and the metadata describing the loaded data may be generated by the application domain logic as the data is transferred to local storage, such as a hard disk.

Figure 1:
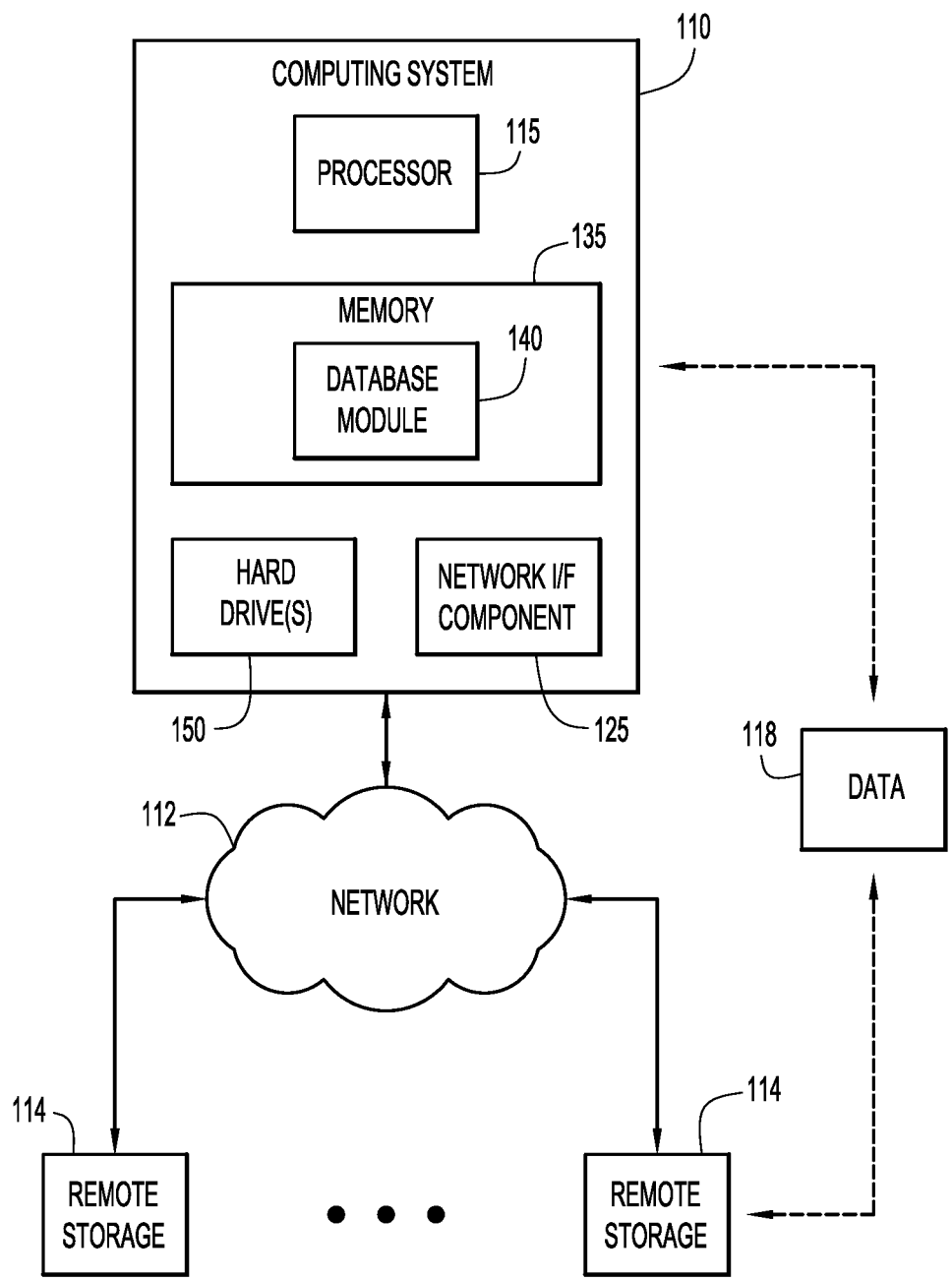
FIG. 1 is a diagrammatic illustration of an example computing environment for use with an embodiment of the present invention.

An example environment for use with present invention embodiments is illustrated in FIG. 1. Specifically, the environment includes one or more computing systems 110, and one or more remote storage systems 114. Computing systems 110 (one is shown in FIG. 1) and remote storage systems 114 (two are shown in FIG. 1) may be remote from each other and communicate over a network 112. The network 112 may be implemented by any number of any suitable communications media (e.g., hardwire, wireless link, wide area network (WAN), local area network (LAN), Internet, Intranet, etc.).

The computing system 110 may be a computer that includes a network interface component 125. In one embodiment, the network interface component 125 may include application domain logic as described herein, which may be configured to pre-process data retrieved from the remote storage system 114. The computing system 110 may be otherwise implemented by any conventional or other computer systems preferably equipped with a display or monitor, a base (e.g., including at least one processor 115, and/or one or more memories 135, one or more hard drives 150), optional input devices (e.g., a keyboard, mouse or other input device), and any commercially available and custom software (e.g., server/communications software, etc.).

The remote storage system 114 may be a storage device, for example, a commercially available SAN device based on Internet Small Computer System Interface (iSCSI).

Computing systems 110 may implement a database system. The database system may include data and logic that may be implemented as database modules 140 in the memory 135 of the computing systems 110. The database system may include data 118 which may be distributed among the computing systems 110 and the remote storages 114. That is, some data 118 of the database system may be stored locally at the hard drive(s) 150 of the computing systems 110 but some data 118 of the database system may be stored remotely at the remote storages 114. In some embodiments, the remote storages 114 may implement data storage logic and store data in the hard drives, flash drives and/or tapes of the remote storages 114.

The database modules 140 may include one or more modules and/or units to perform the various functions of present invention embodiments described herein. The various modules (e.g., database module, etc.) and/or units may be implemented by any combination of any quantity of software and/or hardware modules or units, and may reside within memory 135 of the computing systems 110 for execution by processor 115.

Figure 2:
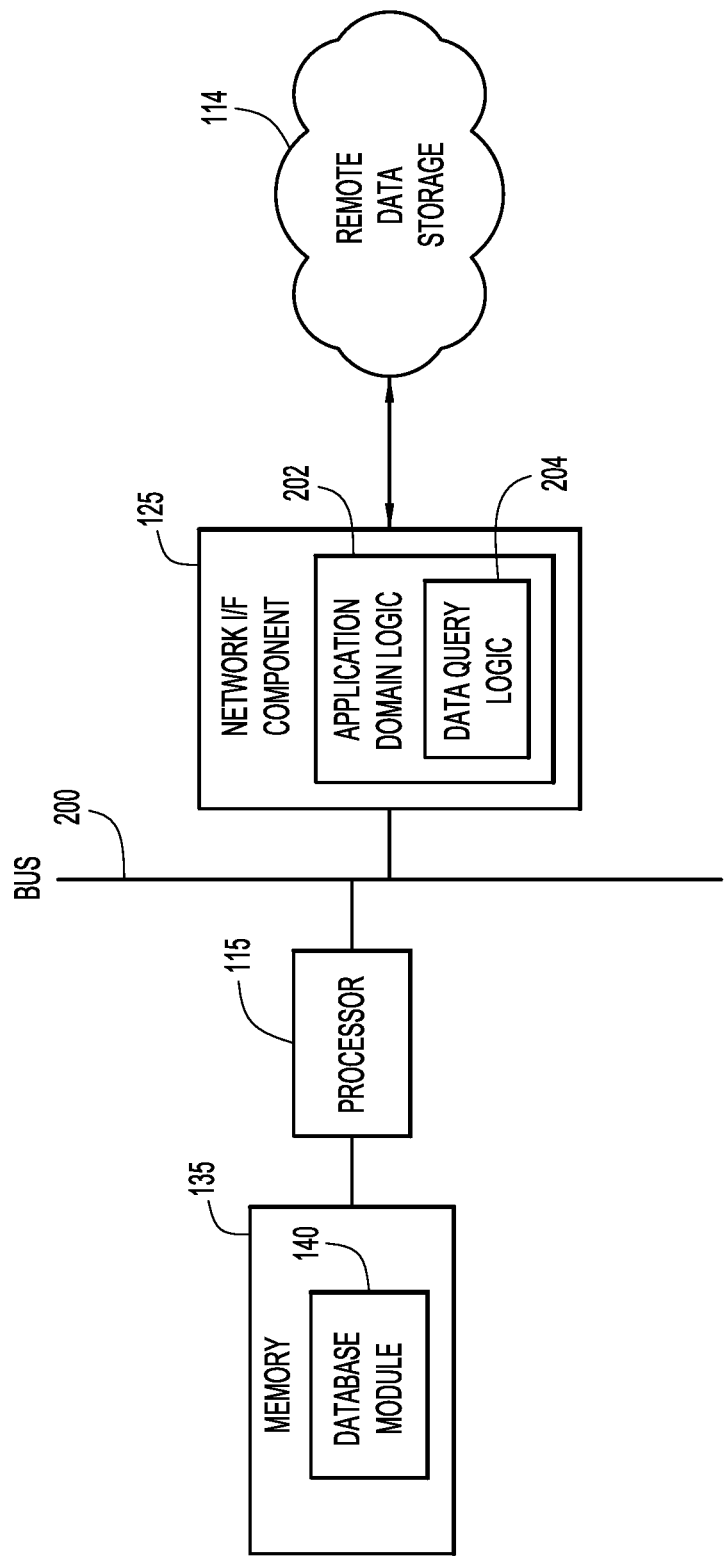
FIG. 2 is a diagrammatic illustration of an example computer running a database system according to an embodiment of the present invention.

FIG. 2 illustrates an example computer configured to execute a database query of data stored in remote data storage according to an embodiment of the present invention. As shown in FIG. 2, the processor 115, which may be a single core or multi-core CPU, may execute instructions implemented by the database module 140 in the memory 135. The instructions may include a query received from a user (e.g., a software application that performs data analysis) for the processor 115 to query data in the database system (e.g., the database module 140). The processor 115 may determine that some data needed by the query may be remote and the location of the remote data, for example, via metadata of the data, parameters of the query, or other information. If the processor 115 determines that at least some data is being remotely stored, the processor 115 may prepare query parameters associated with the remote data and pass the query parameters and the location of the remote data to network interface component 125 via the bus 200. The bus 200 may be an internal bus system of the computing system 110, for example, Peripheral Component Interconnect (PCI), or other internal bus system.

The network interface component 125 may include communication ports, such as Ethernet ports, and may retrieve the remote data from the remote data storage 114 via the communication ports. The network interface component 125 may also comprise application domain logic 202. The application domain logic 202 may implement data query logic 204 that is configured to perform query operations on data received from the remote data storage 114. The query operations may be performed using the query parameters received from the processor 115. The data query logic 204 may also be configured to generate query result data that may be returned to the processor 115. The processor 115 may then formulate a final or partial query result and return to the user application based on the query result data returned by the network interface component 125.

The application domain logic 202 may implement the data query logic 204 in a variety of ways. In one embodiment, for example, the application domain logic 202 may be implemented in a co-processor that may comprise a microprocessor and the data query logic 204 may be implemented by software (e.g., firmware). In other embodiments, the application domain logic 202 (and the data query logic 204) may be implemented as a graphics processor unit (GPU), a field-programmable gate array (FPGA), or an application-specific integrated circuit (ASIC).

Figure 3:
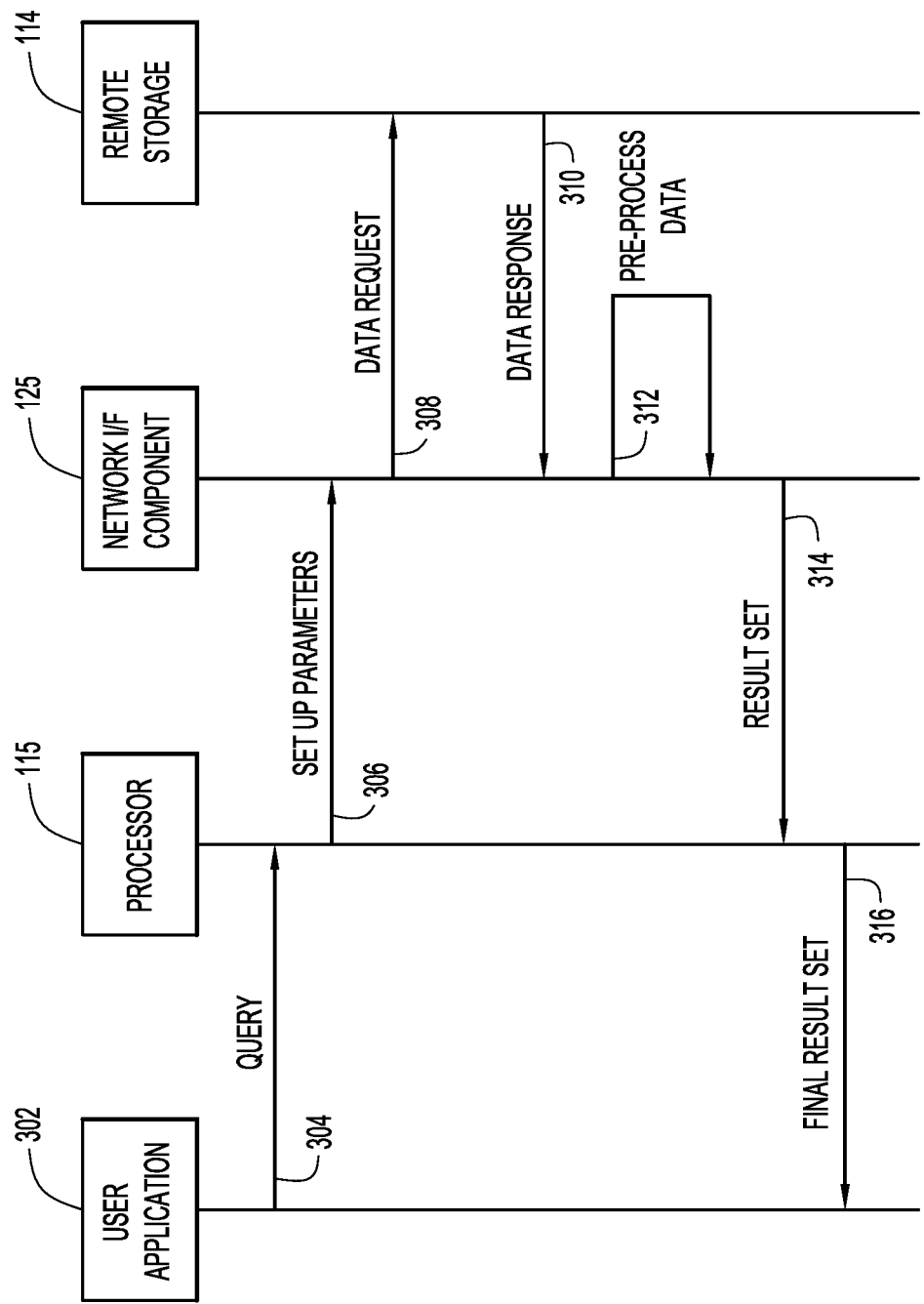
FIG. 3 is a sequence diagram illustrating a sequence of processing steps for querying data stored remotely according to an embodiment of the present invention.

FIG. 3 illustrates a sequence of processing steps for querying data stored remotely according to an embodiment of the present invention. A user application 302 may issue a query at 304. In one embodiment, for example, the user application may be a software application, such as a data reporting application, a data analysis application, a web application, etc. The user application 302 may be executing on the same computing system 110 or on a different machine. The processor 115 may receive the query, set up query parameters and transmit the query parameters to the network interface component 125 at 306. In one embodiment, a database system may store data among a plurality of devices, some of the data may be stored locally, and some of the data may be stored remotely. For example, a database system may store sales data for the most recent year in local hard drives, and store historical sales data for earlier years among a plurality of SAN devices (e.g., each year on a separate storage or one storage containing a number of years). In another example, a database system may store customer information for US customers in local hard drives, and store customer information for foreign customers among a plurality of SAN devices (e.g., each device storing customers for one foreign country).

A query engine of an example database system may be executed by the processor 115. Based on the query, the processor 115 may determine the sources for the data to be queried. For example, the database system may keep information (e.g., metadata) that identifies which portion of data may be stored on which remote device. If a query needs data from earlier years or foreign customers that are stored in remote storage locations, such remote storage locations may be determined based on which year's or which foreign country's data is needed by the query. Based on the search criteria, such as a "FROM" clause in a "SELECT" Structured Query Language (SQL) statement, or a "WHERE" clause, the processor 115 may use the metadata to determine the location of the remote storage. In one embodiment, not all search criteria in a query may be related to the remote data, thus, the processor 115 may formulate query parameter(s) related to the remote data and send the location of the remote device and formulated query parameter(s) to the network interface component 125.

At 308, the network interface component 125 may send one or more data request(s) to the remote storage 114, and at 310 receive one or more data response(s) from the remote storage 114. The data response(s) may comprise data stored remotely at the remote storage 114 but needed at the computing system 110 to perform the query. The network interface component 125 may pre-process the data received from the remote storage 114 at 312. The pre-processing of the data may include performing query operations on the received data using the query parameter(s) received from the processor 115. As described herein, the network interface component 125 may implement application domain logic 202 that may be configured to query the data using the query parameter(s). Thereafter, a query result set of data may be returned by the network interface component 125 to the processor 115 at 314. In one embodiment, if the database stores data locally in a sorted manner, the application domain logic 202 may insert all or part of the received data to locally stored data and shuffle locally stored data if necessary to maintain the stored sorted order. In another embodiment, the remote data may be video. In this embodiment, the data may be pre-processed using the application domain logic 202 and transferred directly to a graphics processing card (GPU) or display card.

The processor 115 may return a final result set to the user application 302 at 316. In one embodiment, the result set returned by the network interface component 125 may be a portion of data needed. For example, the processor 115 may also generate a result set from data stored locally, and/or there may be multiple network interface components 125 that each may generate a result set for data stored in different remote locations. In this embodiment, the processor 115 may generate the final result set by combining data of the result sets returned from the network interface components 125 (if more than one) with any local data (if there is any). In another embodiment, the processor 115 may generate the final result set by performing post-query operations on the result set returned by the network interface component 125, such as but not limited to, formatting the result set according to the user application's requirement. In yet another embodiment, the result set returned by the network interface component 125 may be a intermediate pre-process result. For example, the query parameter(s) applied at the co-processor 202 may not contain all criteria (e.g., all parameters) of the query issued by the user application 302. In this embodiment, the processor 115 may finalize the result set by applying remaining criteria (or all parameters of the query) to generate the final result set. Sometimes, applying remaining criteria also includes combining result sets of data from local storage and/or other remote storage, and applying the remaining criteria (e.g., all parameters of the query) to the combined result sets of data from all sources.

Figure 4:
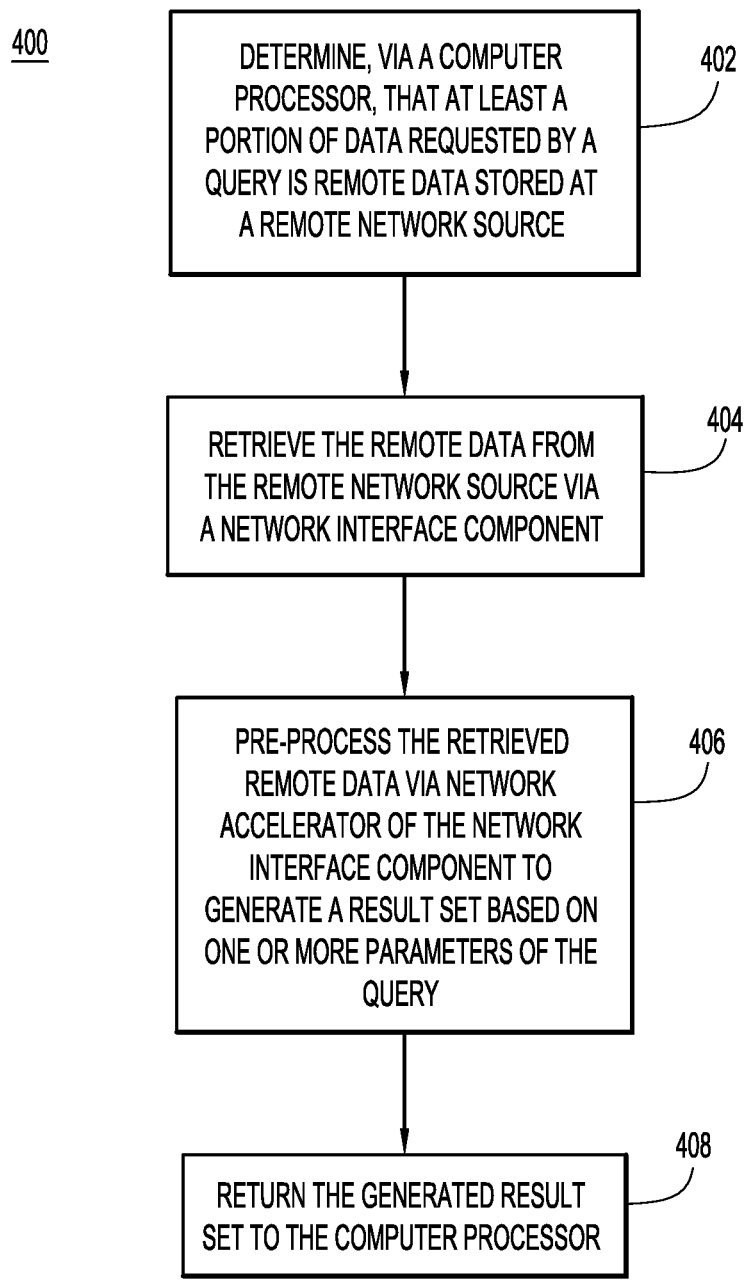
FIG. 4 is a procedural flow chart illustrating a manner in which a data result may be generated according to an embodiment of the present invention.

An exemplary method 400 in which remote data is retrieved and queried, and a result set is generated in a database system according to an embodiment of the present invention is illustrated in FIG. 4. The method 400 may start at block 402, in which a computer processor of a computing system may determine that at least a portion of data requested by a query is remote data stored at a remote network source. At block 404, a network interface component of the computing system may retrieve the remote data from the remote network source. At block 406, the retrieved remote data may be pre-processed using application domain logic of the network interface component to generate a result set based on one or more parameters of the query. At block 408, the query result may be returned to the computer processor.

It will be appreciated that the embodiments described above and illustrated in the drawings represent only a few of the many ways of implementing embodiments for execution of queries on data retrieved from a remote source at a network interface controller using a co-processor. In one embodiment, the method 400 may be implemented by a database system on a computer that uses a computer processor, a network interface component and application domain logic coresiding with the network interface component. In another embodiment, the method 400 may be implemented by a database system that uses a computer processor and a network interface component (with the application domain logic integrated into the network interface component itself). Regardless of whether implemented in a separate application domain logic module or a network interface component itself, some portion or all operations of the method 400 may be implemented in hardware, software or a combination of hardware and software, and may be implemented in a graphics processor unit (GPU), a field-programmable gate array (FPGA), or an application-specific integrated circuit (ASIC).

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, etc.). These systems may include any types of monitors and input devices (e.g., keyboard, mouse, voice recognition, etc.) to enter and/or view information.

It is to be understood that the software (e.g., database system 118, data storage module 140 and application domain logic 202 (if implemented in software)) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., database system 118, data storage module 140 and domain application logic 202 (if implemented in software)) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., tables, relationships, queries). The database system may be implemented by any number of any conventional or other databases, data stores or storage structures (e.g., files, databases, data structures, data or other repositories, etc.) to store information (e.g., e.g., tables, relationships, queries). The database system may be included within or coupled to the computer server systems. The database systems and/or storage structures may be remote from or local to the computer or other processing systems, and may store any desired data (e.g., tables, relationships, queries).

The present invention embodiments may employ any number of any type of user interface (e.g., Graphical User Interface (GUI), command-line, prompt, etc.) for obtaining or providing information (e.g.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface controller in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for processing data of a database system from a network source, comprising:

determining, by a computer processor of a computer, that at least a portion of the data requested by a database query is remote data stored on a storage device at a remote network source and a location of the remote network source, the remote data being remote with respect to the computer and a specialized network interface component included in the computer, the specialized network interface component being separate from the computer processor and a memory of the computer, the specialized network interface component being connected to the computer processor via an internal bus of the computer and including application domain logic;

preparing, by the computer processor, query parameters associated with the remote data;

passing, by the computer processor to the specialized network interface component connected to the computer processor via the internal bus, the query parameters and the location of the remote network source;

performing, by the specialized network interface component, in response to receiving the query parameters and the location of the remote network source, a plurality of actions without any communication from the computer processor, the plurality of actions comprising:

sending at least one data request to the remote network source requesting the remote data upon which query operations will be performed, receiving, in response to the sending of the at least one data request, at least one data response including the remote data from the storage device at the remote network source, pre-processing the received remote data using data query logic included in the application domain logic of the specialized network interface component, the data query logic performing the query operations on the received remote data using the query parameters prepared by the computer processor and generating query result data from the received remote data by performing the query operations using the query parameters, the query result data being different from the received remote data, and returning the generated query result data to the computer processor via the internal bus;

performing, by the computer processor, post-query operations on the generated query result data to produce a final result set for the database query; and providing, by the computer processor, the final result set for the database query to an originator of the database query, wherein:
the performing of the plurality of actions by the specialized network interface component improves an efficiency of the computer by relieving the computer processor from performing the plurality of actions to thereby make the computer processor available for performing other actions while the specialized network interface component performs the plurality of actions.

2. The method of claim 1, wherein the application domain logic is implemented as one of a graphics processor unit (GPU), a field-programmable gate array (FPGA), and an application specific integrated circuit (ASIC).

3. The method of claim 1, further comprising:
determining, by the specialized network interface component, that at least a portion of the received remote data is to be stored in local storage of the computer; and
storing, by the specialized network interface component, the determined portion of the received remote data in the local storage.

4. The method of claim 3, further comprising:
determining, by the specialized network interface component, that local data is stored in a sorted order;
inserting, by the specialized network interface component, the determined portion of the received remote data into the local data and maintaining the sorted order.

5. The method of claim 1, further comprising:
receiving, by the computer processor from the specialized network interface component, a plurality of groups of generated result data, the specialized network interface component having generated the plurality of groups of query result data by pre-processing remote data received from multiple remote network sources; and
generating the final result set for the query, via the computer processor, by combining the received plurality of groups of query result data.

6. The method of claim 1, wherein:
the final result set for the query is based on parameters in the query.

* * * * *